US011878567B2

(12) United States Patent
Cha et al.

(10) Patent No.: US 11,878,567 B2
(45) Date of Patent: Jan. 23, 2024

(54) INTERIOR TRIM OF VEHICLE HAVING AIR-CONDITIONING FUNCTION

(71) Applicants: HYUNDAI MOTOR COMPANY, Seoul (KR); KIA MOTORS CORPORATION, Seoul (KR)

(72) Inventors: Dong Eun Cha, Hwaseong-si (KR); Jin Ho Hwang, Cheonan-si (KR); Sang Heon Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 397 days.

(21) Appl. No.: 16/923,480

(22) Filed: Jul. 8, 2020

(65) Prior Publication Data
US 2021/0260956 A1 Aug. 26, 2021

(30) Foreign Application Priority Data
Feb. 24, 2020 (KR) .......................... 10-2020-0022064

(51) Int. Cl.
| | |
|---|---|
| *B60H 1/00* | (2006.01) |
| *B60R 13/02* | (2006.01) |
| *B60R 21/04* | (2006.01) |
| *B60Q 3/80* | (2017.01) |
| *B60Q 3/54* | (2017.01) |

(52) U.S. Cl.
CPC ..... *B60H 1/00564* (2013.01); *B60H 1/00835* (2013.01); *B60Q 3/54* (2017.02); *B60Q 3/80* (2017.02); *B60R 13/0237* (2013.01); *B60R 21/04* (2013.01)

(58) Field of Classification Search
CPC ............ B60H 1/00295; B60H 1/00564; B60H 1/00814–00871; B60H 2001/3471–3478; B60Q 3/54; B60Q 3/57; B60Q 3/74; B60Q 3/80; B60Q 2500/20; B60R 13/02;
(Continued)

(56) References Cited

U.S. PATENT DOCUMENTS

| | | | | |
|---|---|---|---|---|
| 6,257,975 B1 * | 7/2001 | Giez | .................. | B60H 1/00064 454/127 |
| 7,517,279 B2 * | 4/2009 | Kober | ................ | B60H 1/00285 454/155 |

(Continued)

FOREIGN PATENT DOCUMENTS

| | | |
|---|---|---|
| EP | 1350648 A2 | 10/2003 |
| JP | 2015-528768 A | 10/2015 |

(Continued)

OTHER PUBLICATIONS

Korean Office Action dated May 15, 2021 issued in Korean Patent Application No. 10-2020-0022064.

*Primary Examiner* — Jason M Han
(74) *Attorney, Agent, or Firm* — Morgan, Lewis & Bockius LLP

(57) ABSTRACT

An interior trim of a vehicle includes a trim panel disposed in an interior space of the vehicle and including a plurality of cells configured to be respectively opened or closed. The plurality of cells define openings facing towards the interior space of the vehicle during an opening operation of the plurality of cells. The openings are arranged so that sound, light or air is discharged through the openings to the interior space of the vehicle.

8 Claims, 5 Drawing Sheets

(58) Field of Classification Search
CPC .......... B60R 13/0237; B60R 21/04–05; B60R 2013/0287
See application file for complete search history.

(56) References Cited

U.S. PATENT DOCUMENTS

| | | | |
|---|---|---|---|
| 10,173,615 B2 * | 1/2019 | Steinam | B60K 35/00 |
| 10,415,787 B2 | 9/2019 | Lessard et al. | |
| 10,449,829 B2 * | 10/2019 | Cengil | B60H 1/00985 |
| 2015/0307033 A1 * | 10/2015 | Preisler | B60Q 3/20 |
| | | | 296/1.08 |

FOREIGN PATENT DOCUMENTS

| | | | |
|---|---|---|---|
| JP | 6288449 B2 | | 3/2018 |
| KR | 10-2017-0053016 A | | 5/2017 |
| KR | 10-2018-0056928 A | | 5/2018 |

* cited by examiner

[Fig. 1]
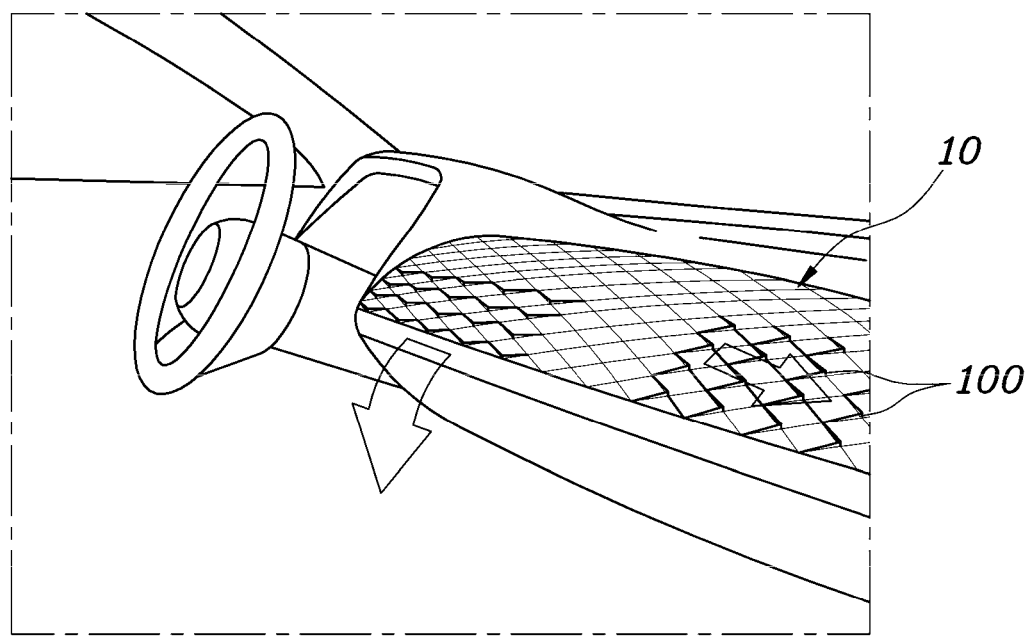

[Fig. 2]
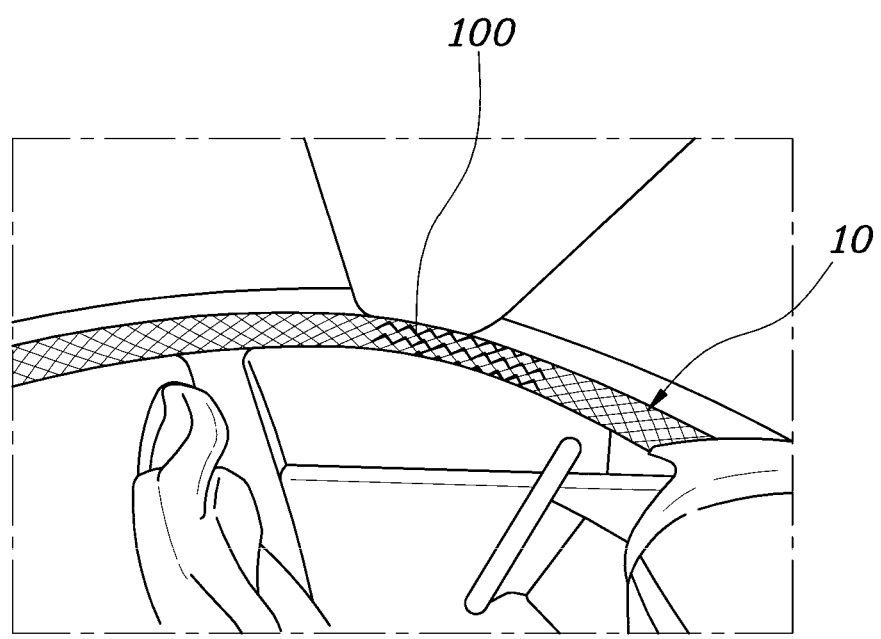

[Fig. 3]
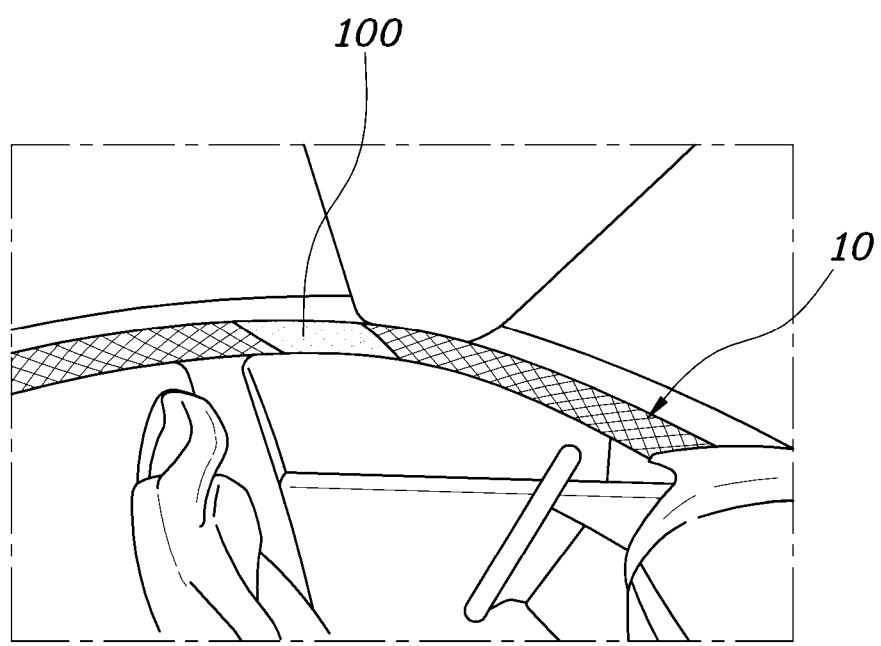

[Fig. 4]
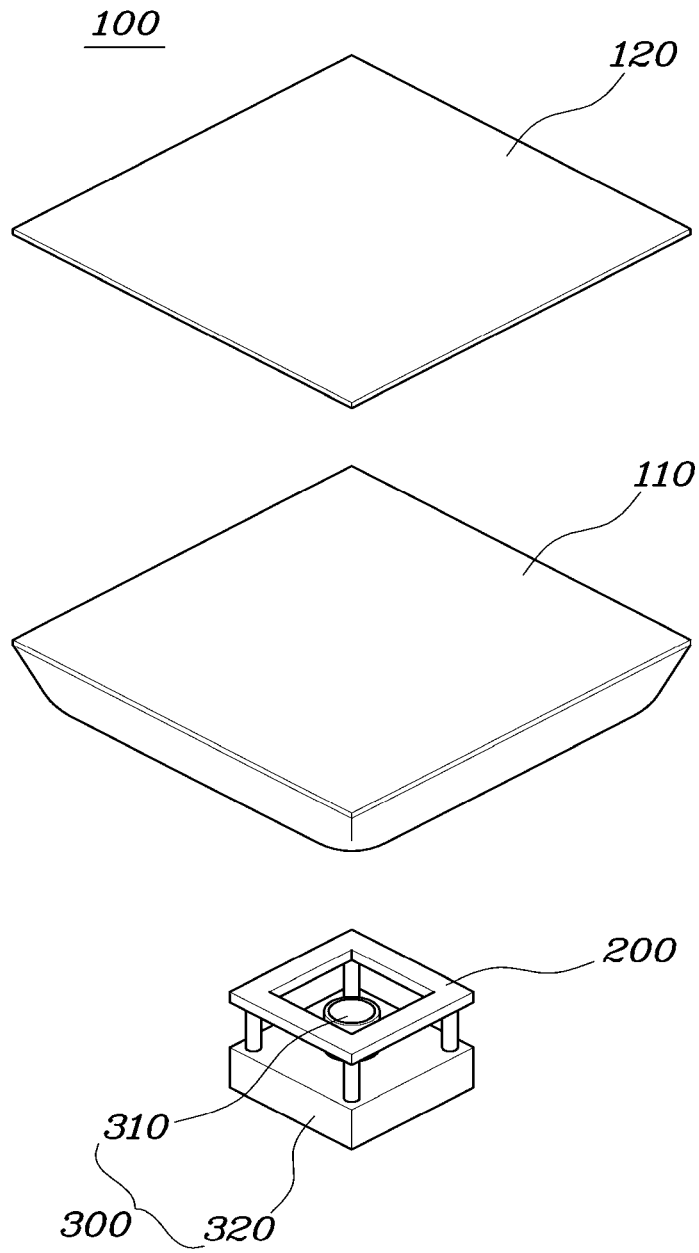

[Fig. 5]
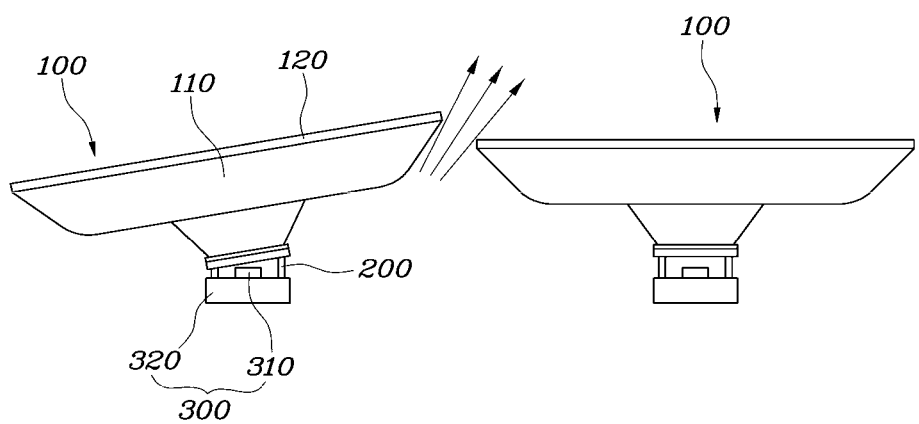

INTERIOR TRIM OF VEHICLE HAVING AIR-CONDITIONING FUNCTION

CROSS-REFERENCE TO RELATED APPLICATION

This application claims the priority benefit of Korean Patent Application No. 10-2020-0022064, filed on Feb. 24, 2020, in the Korean Intellectual Property Office, the disclosure of which is incorporated herein by reference.

TECHNICAL FIELD

The present disclosure relates to an interior trim of a vehicle in which a trim panel includes a plurality of cells, the cells are collectively or individually driven to form openings, and thereby, sound, light or air may be discharged through the openings so as to provide conditioned air and lighting to a place where a passenger is located in an interior space of the vehicle.

BACKGROUND

In modern times, vehicles are being developed into living spaces beyond the past concept of transportation. Therefore, interior air conditioners and lighting apparatuses of vehicles which provide a pleasant environment to passengers in the vehicles are continuously being developed.

In a general vehicle, air conditioned by an air conditioner is discharged to an interior space of the vehicle through an air vent facing towards the interior space. The direction of discharged air is adjusted by a plurality of blades provided at an outlet of the air vent. The blades are rotated at a designated angle up, down, left and right, thus being capable of adjusting the direction of conditioned air. However, in the above conventional vehicle, air is supplied to the interior space of the vehicle only through the air vent provided at a restricted position, and thus, air may not be supplied to a position desired by a passenger. Further, the rotation angle of the blades is limited, and thus, there is a limit in controlling the direction of air discharged through the air vent.

Further, a general lighting apparatus for vehicles is configured to provide lighting through a room lamp installed on the ceiling of an interior space of a vehicle. In this case, the lighting apparatus may control only the amount of light by turning on/off the lighting apparatus or adjusting the level of the lamp by a passenger, but may not implement various lighting modes in the interior space of the vehicle.

Further, as autonomous vehicles which are autonomously driven without driver manipulation are developed, a passenger riding position in the interior space of a vehicle may become diversified. According to development of autonomous driving technology, it will be expected that a seat arrangement and a riding posture may be variously changed, but the conventional air conditioner and lighting apparatus for vehicles may not provide conditioned air and lighting accurately to a position at which a passenger is located.

Therefore, development of an air conditioner and a lighting apparatus for vehicles, which may implement various air-conditioning modes and lighting modes in response to development of autonomous driving technology and thus provide a pleasant interior environment to passengers so as to be appropriate for the concept of modern vehicles, is required.

SUMMARY

Therefore, the present disclosure has been made in view of the above problems, and it is an object of the present disclosure to provide an interior trim of a vehicle in which a trim panel includes a plurality of cells, the cells are controlled so as to precisely control conditioned air and lighting provided to an interior space of the vehicle, and various air-conditioning modes and lighting modes may be implemented thereby.

In accordance with the present disclosure, the above and other objects can be accomplished by the provision of an interior trim of a vehicle, the interior trim including a trim panel disposed in an interior space of the vehicle and including a plurality of cells configured to be respectively opened or closed. The plurality of cells define openings facing towards the interior space of the vehicle during an opening operation of the plurality of cells. The openings are arranged so that sound, light or air is discharged through the openings to the interior space of the vehicle.

The interior trim may further include a duct arranged within the trim panel and having one side of the duct connected to an air conditioner and another side connected to the trim panel to supply air conditioned by the air conditioner to the openings of the respective cells, so as to perform an air-conditioning function.

The interior trim may further include a lighting module arranged within the trim panel and configured to emit light towards the trim panel to provide lighting to the interior space of the vehicle, so as to perform a lighting function.

The light modules may be arranged in plural, and the trim panel may further include a lighting controller configured to selectively control the lighting modules so as to implement a plurality of lighting modes in the interior space of the vehicle.

The trim panel may further include actuators configured to respectively drive the cells so as to tilt the cells and perform an opening or closing operation of the respective cells.

The trim panel may further include an air-conditioning controller configured to selectively control the actuators so as to implement a plurality of air-conditioning modes in the interior space of the vehicle.

The air-conditioning controller may be configured to control an air conditioner by interworking with driving of the actuators.

The air-conditioning controller may be configured to control a tilting direction, angle and area of the cells so as to control a direction and volume of air supplied to the openings, and may be configured to control air conditioned by an air conditioner depending on the direction and volume of the air.

The trim panel may be disposed on one of a crash pad, a pillar trim and a door trim in the interior space of the vehicle.

The trim panel may further include a plurality of unit cell panels disposed to face towards the interior space of the vehicle, actuators configured to perform an opening or closing operation of the unit cell panels respectively, and lighting modules configured to emit light to the unit cell panels respectively so as to provide lighting to the interior space of the vehicle.

Each of the lighting modules may include a light emitting element configured to emit light of a color selected from a plurality of colors, and a color of light emitted by the lighting modules may be varied depending on an air-conditioning mode.

The interior trim may further include a light emitting panel on a surface of each of the unit cell panels.

The interior trim may further include a protrusion disposed on a lower part of each of the unit cell panels and connected to a corresponding one of the actuators, and the unit cell panel may have a shape having a cross-sectional area which is increased in a direction from the lower part of the unit cell panel arranged with the protrusion disposed thereon to a surface of the unit cell panel so as to diffuse light emitted by the lighting module.

The unit cell panels may be configured to be independently driven by the actuators respectively so as to implement various air-conditioning modes of the vehicle.

The unit cell panels may have a shape having a corner and an angle at one side thereof and. The corner of an arbitrary unit cell panel may be configured to be tilted upwards by driving a corresponding one of the actuators, such that the angle of the unit cell panel is increased and light is reflected by a lower surface of the corner.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a view illustrating an interior trim of a vehicle having an air-conditioning function according to one embodiment of the present disclosure, in which a trim panel is provided on a crash pad;

FIG. 2 is a view illustrating the interior trim according to one embodiment of the present disclosure, in which the trim panel is provided on a pillar trim;

FIG. 3 is a view illustrating the interior trim according to one embodiment of the present disclosure, which provides lighting to an interior space of the vehicle;

FIG. 4 is an exploded perspective view of a cell constituting the trim panel of the interior trim according to one embodiment of the present disclosure; and FIG. 5 is a view illustrating driving of the trim panel of the interior trim according to one embodiment of the present disclosure.

DETAILED DESCRIPTION OF THE EXEMPLARY EMBODIMENTS

Specific structural or functional descriptions in embodiments of the present disclosure set forth in the description which follows will be exemplarily given to describe the embodiments of the present disclosure. However, the present disclosure may be embodied in many alternative forms, and should not be construed as being limited to the embodiments set forth herein.

The embodiments of the present disclosure may be variously modified and changed, and thus specific embodiments of the present disclosure will be illustrated in the drawings and described in detail in the following description of the embodiments of the present disclosure. However, it will be understood that the embodiments of the present disclosure are provided only to completely disclose inventive concepts and cover modifications, equivalents or alternatives which come within the scope and technical range of the disclosure.

Reference will now be made in detail to the exemplary embodiments of the present disclosure, examples of which are illustrated in the accompanying drawings. Wherever possible, the same reference numbers will be used throughout the drawings to refer to the same or like parts.

The present disclosure relates to an interior trim 10 of a vehicle, which is installed in an interior space of the vehicle. The interior trim 10 includes a trim panel 100 including a plurality of cells, and may control air-conditioning and lighting as needed by driving the respective cells, thereby being capable of providing a pleasant environment to a passenger.

FIG. 1 is a view illustrating the interior trim 10 according to one embodiment of the present disclosure, in which the trim panel 10 is provided on a crash pad.

Referring to FIG. 1, the interior trim 10 according to one embodiment of the present disclosure may include the trim panel 100.

The trim panel 100 may be installed in the interior space of the vehicle so as to be exposed to a passenger. The trim panel 100 may include a plurality of cells, and the respective cells may have the same shape or different shapes. The cells may be configured to be respectively driven. When the cells are driven, an opening or closing operation may be performed.

The opening or closing operation is an operation of driving the cells, and when the opening operation of the cells is performed, openings facing towards the interior space of the vehicle may be formed in the trim panel 100. Sound, light or air may be discharged to the interior space of the vehicle through the openings formed in the trim panel 100.

In addition, the interior trim 10 according to one embodiment of the present disclosure may further include a duct (not shown). The duct may form a flow path along which air conditioned by an air conditioner of the vehicle flows. The duct may be provided within the trim panel 100, and air having passed through the air conditioner is moved to the trim panel 100 along the duct. One side of the duct may be connected to the air conditioner, and the other side of the duct may be connected to the trim panel 100, thereby being capable of supplying conditioned air to the openings formed in the trim panel 100. The duct and the air conditioner have configurations which are generally used in vehicles, and a detailed description thereof will thus be omitted.

The trim panel 100 may include actuators 200 (shown in FIG. 4) configured to perform the opening or closing operation of the cells so as to form the openings. The cells collectively form the surface of the trim panel 100. When at least one cell is tilted at a designated angle by the actuator 200, the opening communicating with the duct may be formed in the surface of the trim panel 100. Therefore, when conditioned air flows into the interior space of the vehicle, the openings are formed by the actuators 200, and thus air conditioned by the air conditioner may flow into the interior space of the vehicle through the openings.

The actuators 200 may be provided in plural, and the trim panel 100 may further include an air-conditioning controller configured to selectively control the plurality of actuators 200. The air-conditioning controller may control the actuators 200 to selectively drive the cells, thereby being capable of implementing various air-conditioning modes.

The air-conditioning controller may not only control driving of the actuators 200 but also control the air conditioner by interworking with driving of the actuators 200. For example, if a passenger in the interior space of the vehicle intends to receive strong cold air or warm air, in order to increase the amount of air flowing into the interior space, the passenger may operate the air-conditioning controller to increase the area of the openings or the angle of the cells. In this case, in addition to control of driving of the actuators 200, the air-conditioning controller may control the air conditioner so as to create an environment desired by the passenger within a short time, thereby being capable of increasing the amount of air passing through the air conditioner. Otherwise, if the passenger operates the air-conditioning controller so as to decrease the amount of air flowing into the interior space, the air-conditioning controller may control the air conditioner so as to decrease the amount of air flowing from the air conditioner by interworking with the decrease in the amount of the air flowing into the interior space.

That is, the air-conditioning controller controls the tilting direction, angle and area of the cells so as to control the direction and volume of air supplied to the openings, and controls air conditioned by the air conditioner depending on the air direction and volume.

FIG. 2 is a view illustrating the interior trim 10 according to one embodiment of the present disclosure, in which the trim panel 100 is provided on a pillar trim.

Referring to FIGS. 1 and 2, the trim panel 100 may be provided on a crash pad and/or a pillar trim in the interior space of the vehicle. Further, although not shown in the drawings, the trim panel 100 may be provided on a door trim. That is, the interior trim 10 according to one embodiment of the present disclosure may be provided at any place of the interior space of the vehicle which may provide conditioned air and lighting to the interior space.

FIG. 3 is a view illustrating the interior trim 10 according to one embodiment of the present disclosure, which provides lighting to the interior space of the vehicle.

The interior trim 10 according to one embodiment may further include a lighting module 300 (shown in FIG. 4) so as to provide lighting to the interior space of the vehicle. The lighting module 300 may be provided within the trim panel 100. The lighting module 300 may emit light towards the trim panel 100, and light may be exposed to the interior space through the cells of the trim panel 100, thereby providing lighting to the interior space.

The lighting module 300 may be provided in plural. The trim panel 100 according to one embodiment may further include a lighting controller. A passenger may selectively control the plurality of lighting modules 300 through the lighting controller, thereby being capable of implementing various lighting modes in the interior space of the vehicle. For example, the lighting controller may control the position and area of a place of the trim panel 100 to which lighting is provided, thereby providing lighting to a place of the interior space required by the passenger. Further, the lighting controller may control the angle of emitted light through driving of the cells, and thus provide lighting directly to the interior space of the vehicle or provide delicate lighting, such as mood lighting, to the interior space of the vehicle. The lighting controller may integrally control the plurality of lighting modules 300, thereby being capable of implementing various lighting modes which may not be implemented by a lighting apparatus provided in a conventional vehicle.

Particularly, in a vehicle which may have various applications, configurations and arrangements of the interior space of the vehicle according to development of autonomous driving technology, a passenger riding position and riding posture may become diversified. In a traditional vehicle which is driven and manipulated by a person, seats are disposed to face forwards but, if the autonomous driving technology is applied, driver intervention is minimized or eliminated and thus it is not necessary to dispose the seats to face forwards. In this case, there is a limit to provide lighting and conditioner air accurately to a place where a passenger is located using the conventional lighting apparatus and air conditioner. Therefore, the interior trim 10 according to one embodiment of the present disclosure forms openings at a place where a passenger is located, and may thus provide conditioned air and lighting to the place where the passenger is located.

FIG. 4 is an exploded perspective view of a cell constituting the trim panel 100 of the interior trim 10 according to one embodiment of the present disclosure.

Referring to FIG. 4, elements of the cell will be described in detail below.

The trim panel 100 may include a plurality of unit cell panels 110 disposed to face towards the interior space of the vehicle, the actuators 200 configured to perform the opening or closing operation of the unit cell panels 120, and the lighting modules 300 configured to provide lighting.

The unit cell panel 110, which is an element corresponding to a main body of the cell, is disposed to face towards the interior space of the vehicle, and may thus be exposed to a passenger. The unit cell panel 110 and other adjacent unit cell panels 110 are gathered to form the surface of the trim panel 100, and the unit cell panels 100 are driven to provide lighting to and/or discharge conditioned air to the interior space of the vehicle.

The actuator 200 is an element corresponding to a drive unit configured to perform the opening or closing operation of the corresponding unit cell panel 110. The actuator 200 may be connected to the lower surface of the unit cell panel 110, and drive the unit cell panel 110 using a method for tilting the unit cell panel 110 in any direction, i.e., up, down, left or right, in response to an electrical signal.

Since the actuator 200 is provided in each of the respective unit cell panels 110, the passenger may control an air-conditioning mode or a lighting mode by driving the respective unit cell panels 110. Therefore, various air-conditioning modes or lighting modes may be implemented.

The lighting module 300 may be a light emitter which performs a function of providing lighting to the interior space of the vehicle. The lighting module 300 is provided below the unit cell panel 110 and, when the light module 300 emits light, lighting is provided to the interior space of the vehicle. Since the amount and angle of light exposed to the interior space of the vehicle may be controlled by controlling the opening or closing operation of the unit cell panels 110, various lighting modes may be implemented.

The lighting module 300 may include a light emitting element 310, such as a light emitting diode (LED), and a PCB 320 configured to electrically control the light emitting element 310. Particularly, the light emitting element 310 of the lighting module 300 may emit light of a color selected from a plurality of colors, and thus selectively control a color of light by interworking with an air-conditioning mode.

For example, red light emitting elements 310 emit light when the air-conditioning mode of the vehicle is a heating mode, blue light emitting elements 310 emit light when the air-conditioning mode of the vehicle is a cooling mode, and green light emitting elements 310 emit light when the air-conditioning mode of the vehicle is a ventilation mode or a purification mode. Therefore, the passenger may intuitively recognize the air-conditioning mode of the vehicle, and thus feel a sense of emotional stability and easily determine malfunction of the air conditioner.

Further, a light emitting panel 120 may be provided on the surface of the unit cell panel 110. The light emitting panel 120 may be an organic light emitting diode (OLED). Since the surface of the unit cell panel 110 is exposed to the interior space of the vehicle so as to face towards the passenger, the light emitting panel 120 may be provided on the surface of the unit cell panel 110 so as to provide lighting. That is, the light emitting module 300 may emit light so as to perform the lighting function, or the light emitting panel 120 may emit light so as to perform the lighting function. Therefore, in the present disclosure, the passenger may select a lighting mode as needed, and thereby, lighting appropriate to a purpose may be provided.

FIG. 5 is a view illustrating driving of the trim panel 100 of the interior trim 10 according to one embodiment of the present disclosure.

The cells are disposed adjacent to one another and thus, in a normal state, the unit cell panels 110 may block inflow of air having passed through the air conditioner to the interior space of the vehicle. In order to allow conditioned air to flow into the interior space of the vehicle, the cells are selectively driven to form openings so that air conditioned by the air conditioner flows into the interior space of the vehicle through the openings.

Referring to FIG. 5, among the plurality of cells disposed adjacent to one another, an arbitrary cell is selectively tilted, thus forming an opening. That is, since the unit cell panels 110 may be independently driven by the respective actuators 200, the position and area of the opening through which air is discharged may be controlled as needed.

When the unit cell panel 110 of a cell located at a position, to which it is desired to supply air, is tilted to one side by controlling the actuator 200 of the corresponding cell, a gap occurs between the corresponding unit cell panel 110 and an adjacent unit cell 110, and such a gap may form an opening. Conditioned air may flow into the interior space of the vehicle through the opening.

Further, the amount and direction of air flowing into the interior space of the vehicle may be adjusted by controlling driving of the unit cell panels 110. When the tilting angle of the unit cell panel 110 is increased, a gap between the corresponding unit cell panel 110 and an adjacent unit cell panel 110 is increased, and thus, the amount of air flowing into the interior space of the vehicle may be increased. Further, when the unit cell panels 110 are set to be tilted in different directions depending on the positions of the unit cell panels 110, air may be controlled to flow in different directions into the interior space of the vehicle. In the conventional air conditioner, conditioned air flows into the interior space of a vehicle only through an air vent provided at a restricted position and thus the air may not flow to a position desired by a passenger in the interior space of the vehicle. However, in the present disclosure, air may flow to a position desired by a passenger in the interior space of the vehicle.

The unit cell panels 110 may be tilted in various forms, and various air-conditioning modes may be implemented by controlling tilting of the unit cell panels 110 as needed.

The unit cell panel 110 and the actuator 200 may be connected in various forms. Referring to FIG. 5, a protrusion may be formed on the lower part of the unit cell panel 110, and the protrusion may be connected to the actuator 200.

The protrusion may have a cross-sectional area less than the area of the surface of the unit cell panel 110, and protrude from the lower portion of the unit cell panel 110 opposite to the surface of the unit cell panel 110. The unit cell panel 110 may have a shape, the cross-sectional area of which is increased in a direction from the lower part of the unit cell panel 110 provided with the protrusion formed thereon to the surface of the unit cell panel 110. Therefore, when the lighting module 300 emits light, effective lighting may be provided to the interior space of the vehicle through diffusion of light.

Further, the unit cell panels 110 may have a shape having a corner and an angle at one side thereof. Although FIGS. 1 to 5 illustrates the unit cell panels 110 as having a diamond shape, the unit cell panels 110 may have any shape including corners and angles. When the lighting module 300 emits light, the light travels to the surface of the unit cell panel 110. When the tilting angle of the unit cell panel 110 is controlled, the light may be reflected by the lower surface of the corner, and thus, delicate lighting, such as mood lighting, may be provided to the interior space of the vehicle.

The aforementioned operations/functions performed by the controller such as the air-conditioning controller or the lighting controller can be embodied as computer readable code/algorithm/software stored on a computer readable recording medium. The computer readable recording medium is any data storage device that can store data which can thereafter be read by a computer or a processor/microprocessor. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

The aforementioned controller such as the air-conditioning controller or the lighting controller may include one or more processors/microprocessors and a non-transitory computer readable recording medium storing computer readable code/algorithm/software. Such processor(s)/microprocessor(s) may perform the above described operations/functions, by executing the computer readable code/algorithm/software stored on the computer readable recording medium.

As is apparent from the above description, an interior trim of a vehicle according to the present disclosure includes a trim panel provided in the interior space of the vehicle and including a plurality of cells, and controls the cells so as to provide conditioned air and lighting to a position desired by a passenger, thereby being capable of improving an interior environment of the vehicle.

Further, the interior trim according to the present disclosure may implement various air-conditioning modes and lighting modes by independently controlling the respective cells, thereby being capable of maximizing utilization of the interior space of the vehicle.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An interior trim of a vehicle, the interior trim comprising:
    a trim panel disposed in an interior space of the vehicle and comprising a plurality of cells configured to be respectively opened or closed,
    wherein the plurality of cells define openings facing towards the interior space of the vehicle during an opening operation of the plurality of cells,
    wherein the trim panel further comprises:
        a plurality of unit cell panels disposed to face towards the interior space of the vehicle;
        actuators configured to perform an opening or closing operation of the unit cell panels respectively;
        lighting modules configured to emit light to the unit cell panels respectively so as to provide lighting to the interior space of the vehicle; and
        a protrusion disposed on a lower part of each of the unit cell panels and connected to a corresponding one of the actuators, and
    wherein the unit cell panel has a shape having a cross-sectional area which is increased in a direction from the lower part of the unit cell panel arranged with the protrusion disposed thereon to a surface of the unit cell panel so as to diffuse light emitted by the lighting module.

2. The interior trim according to claim 1, wherein the openings are arranged so that sound, light or air is discharged through the openings to the interior space of the vehicle.

3. The interior trim according to claim 1, further comprising a duct arranged within the trim panel and having one side of the duct connected to an air conditioner and another side connected to the trim panel to supply air conditioned by the air conditioner to the openings of the respective cells, so as to perform an air-conditioning function.

4. The interior trim according to claim 1, wherein:
the trim panel further comprises a lighting controller configured to selectively control the lighting modules so as to implement a plurality of lighting modes in the interior space of the vehicle.

5. The interior trim according to claim 1, wherein the trim panel is disposed on one of a crash pad, a pillar trim and a door trim in the interior space of the vehicle.

6. The interior trim according to claim 1, wherein each of the plurality of cells comprises a light emitting element configured to emit light of a color selected from a plurality of colors, and a color of light emitted by a respective one of the plurality of cells is varied depending on an air-conditioning mode.

7. The interior trim according to claim 1, wherein
a light emitting panel is disposed on a surface of each of unit cell panels.

8. The interior trim according to claim 1, wherein
the plurality of unit cell panels have a shape having a corner and an angle at one side thereof, and
the corner of an arbitrary unit cell panel is configured to be tilted upwards by driving a corresponding one of the plurality of actuators, such that the angle of the arbitrary unit cell panel is increased and light is reflected by a lower surface of the corner.

* * * * *